United States Patent [19]

Ujita et al.

[11] Patent Number: 4,592,440
[45] Date of Patent: Jun. 3, 1986

[54] POWER STEERING APPARATUS

[75] Inventors: Tsuginobu Ujita; Seiichi Takahashi, both of Sakai, Japan

[73] Assignee: Kubota, Ltd., Osaka, Japan

[21] Appl. No.: 629,925

[22] Filed: Jul. 11, 1984

[30] Foreign Application Priority Data

Jul. 28, 1983 [JP] Japan ............................ 58-118138[U]

[51] Int. Cl.$^4$ .............................................. A63C 5/08
[52] U.S. Cl. ...................................... 180/155; 180/157
[58] Field of Search ................ 180/154, 155, 156, 157

[56] References Cited

U.S. PATENT DOCUMENTS

| | | | |
|---|---|---|---|
| 3,768,585 | 10/1973 | Matteo | 180/154 |
| 4,114,724 | 9/1978 | Doolittle | 180/155 |
| 4,319,654 | 3/1982 | Ujita | 180/155 |

FOREIGN PATENT DOCUMENTS

| | | | |
|---|---|---|---|
| 2642904 | 3/1978 | Fed. Rep. of Germany | 180/155 |
| 1478629 | 7/1977 | United Kingdom | 180/155 |

Primary Examiner—William R. Cline
Assistant Examiner—Peggy A. Neils
Attorney, Agent, or Firm—Edwin E. Greigg

[57] ABSTRACT

A power steering apparatus comprises a center pin having an axis of forward-rearward direction of a vehicle body and disposed at the middle portion of the vehicle body in the transverse direction, a front wheel supporter disposed swingably about the center pin, a steering arm for each of front wheels operatively connected to the front wheel supporter and a steering cylinder 23 for operating the steering arms. The steering cylinder is disposed perpendicular to the center pin and mounted on the front wheel supporter so as to swing in integral with the front wheel supporter.

5 Claims, 14 Drawing Figures

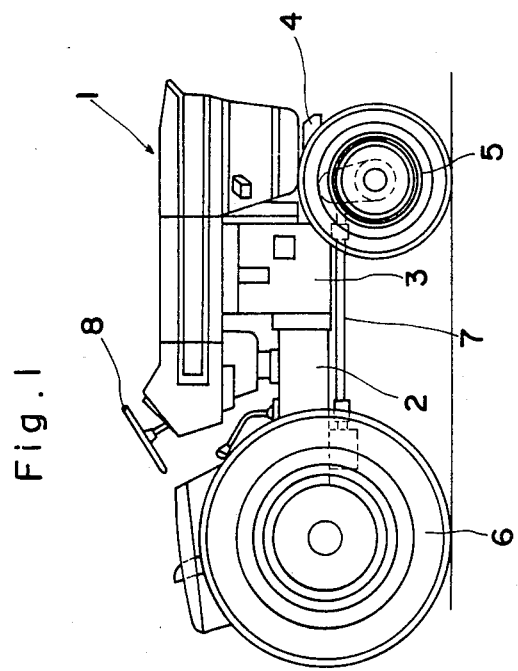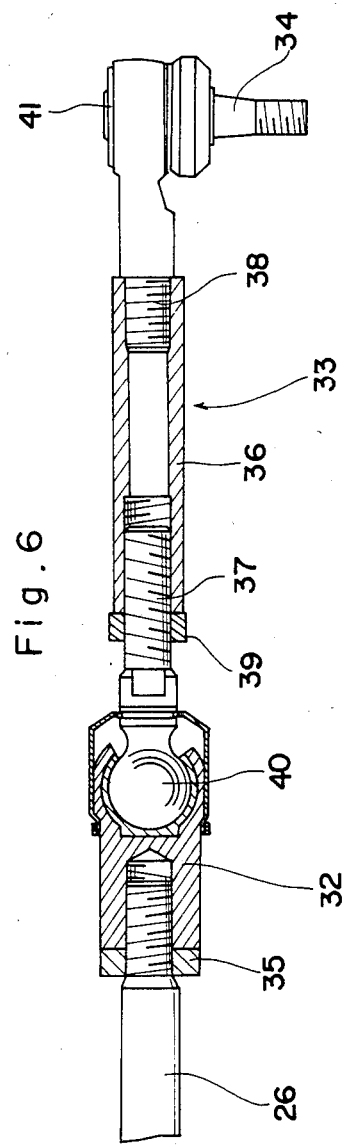

4,592,440

POWER STEERING APPARATUS

BACKGROUND OF THE INVENTION

The present invention relates to a power steering apparatus for tractors and the like, and particularly to such a power steering apparatus for steering driven or non-driven front wheels by means of a steering cylinder.

For example, there is such an agricultural tractor which provides therewith a center pin, which has an axis of forward-rearward direction, at the middle portion in the direction of the width of the tractor body, a front wheel supporter mounted to be swingable about the center pin and a steering apparatus for steering front wheels.

According to the tractor of the prior art, as shown in FIG. 14, a steering cylinder 101 is pivoted on the tractor body with an end 102 thereof and the other end thereof is pivotally connected to steering arms 103 for the front wheels. When the front wheel supporter 104 is swung about the center pin, the steering cylinder 101 tends to swing about the pivoted portion on the tractor body. Therefore, it is difficult to obtain a wide range of swing of the front wheel supporter 104 since the steering cylinder prevents or blocks its movement of the front wheel supporter. Further, there is a disadvangage that ricketiness or looseness may easily take place about the connecting portion between the steering cylinder and the steering arms 103 of the tractor body since the front wheel supporter 104 cannot swing with the steering cylinder 101.

Further, since the steering cylinder operatively connects the stationary tractor body to the front wheels which are swingable about the center pin, when the front wheels swing up and down, there occurs a relative gap between the stationary body and the swingable wheels and as the result the front wheels may be steered slightly. This causes unstable traveling.

SUMMARY OF THE INVENTION

The present invention has an object to solve the above mentioned disadvantages of the prior art.

The power steering apparatus according to the present invention comprises a center pin which extends in a forward direction of a vehicle body and is disposed at the middle portion of the vehicle body a front wheel supporter disposed swingably about the center pin, a steering arm for each of the front wheels operatively connected to the front wheel supporter, and a steering cylinder for operating the steering arms, characterized in that the steering cylinder is disposed perpendicular to the center pin and mounted on the front wheel supporter so as to swing with the front wheel supporter.

Namely, since the steering cylinder swings with the front wheel supporter, it is easy to obtain a swing range of great angle of the front wheel supporter and to avoid the disadvantage that the steering cylinder would prevent or block the movement of the front wheel supporter as in the prior art. Further, there occurs no relative gap between each of the movements of the steering cylinder and the front wheel supporter and therefore ricketiness or looseness between the connecting portions of the steering cylinder and the steering arms may be avoided. This means that when the front wheels swing up and down about the center pin, unexpected mis-steering action for the front wheels will not take place since no relative gap occurs between the front wheels and the steering cylinder, though it is apparent that this could happen in the prior art device. Accordingly, stable traveling may be realized without unexpected or mis-steering operation due to the up and down movements of the front wheels.

In addition to the above advantages the present invention is useful as it is simple in construction and may be manufactured at low costs.

Other advantages will be apparent from the following description.

BRIEF DESCRIPTION OF THE DRAWINGS

FIGS. 1 through 6 show the first embodiment of the present invention in which:

FIG. 1 is an overall side view of a tractor,

FIG. 2 is a front view of front wheel steering system,

FIG. 3 is a plan view of FIG. 2,

FIG. 4 is a sectional view of A—A line in FIG. 2,

FIG. 5 is a sectional view of B—B line in FIG. 4,

FIG. 6 is a partially sectional view of a turnbuckle,

FIGS. 7 through 9 show the second embodiment thereof in which:

FIG. 7 is a sectional side view of the essential portion thereof,

FIG. 8 is a view of C—C line in FIG. 7,

FIG. 9 is a sectional view of D—D line in FIG. 8,

FIGS. 10 and 11 show the third embodiment thereof in which:

FIG. 10 is a sectional side view of the essential portion thereof,

FIG. 11 is a view of E—E line in FIG. 10,

DESCRIPTION OF THE PREFERRED EMBODIMENTS

Figure 2:
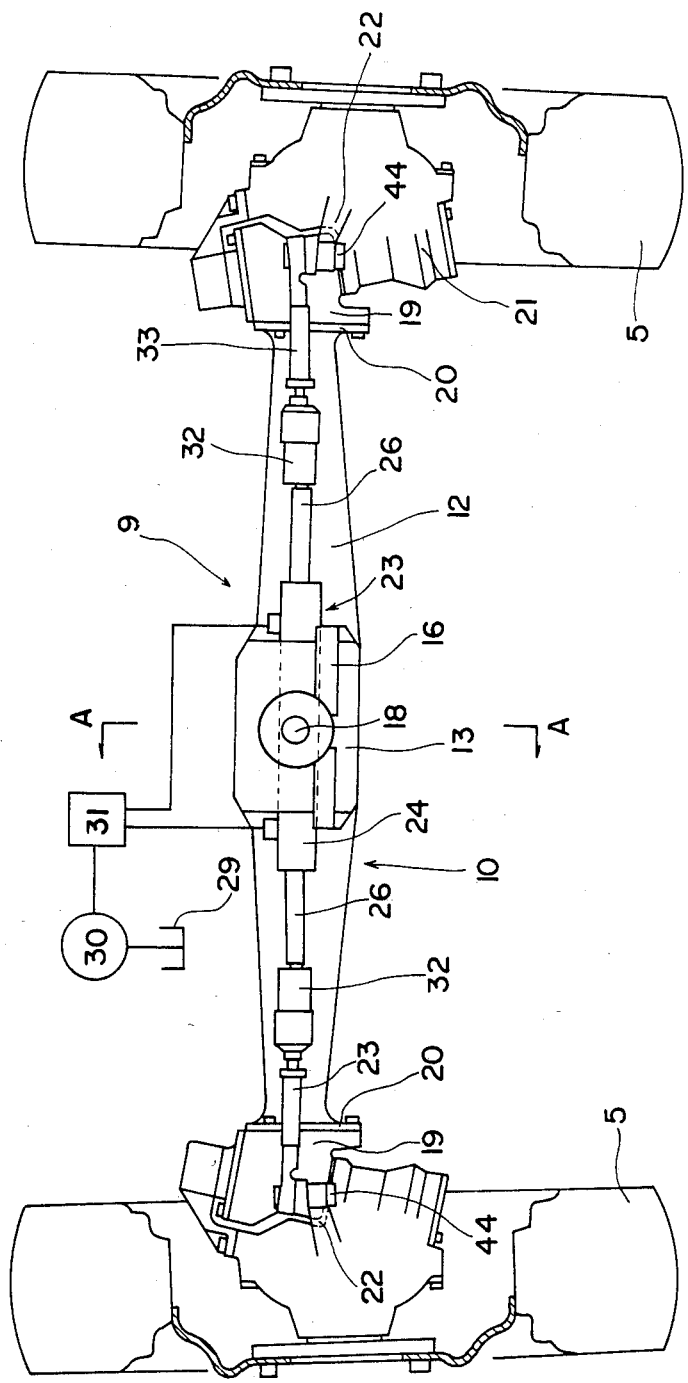
Figure 3:
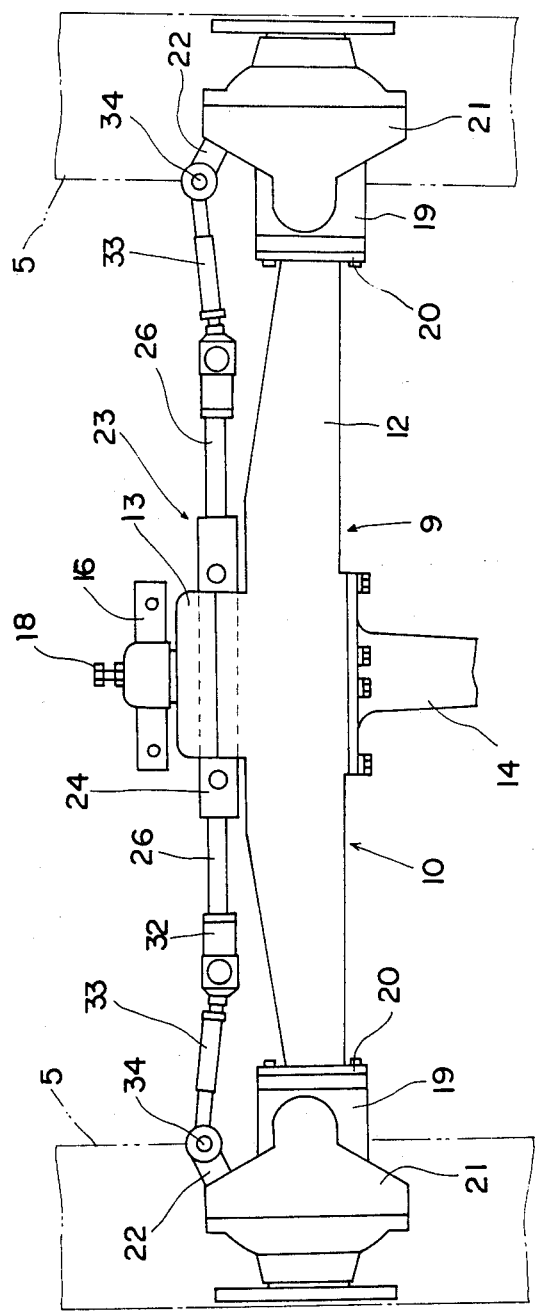
Figure 4:
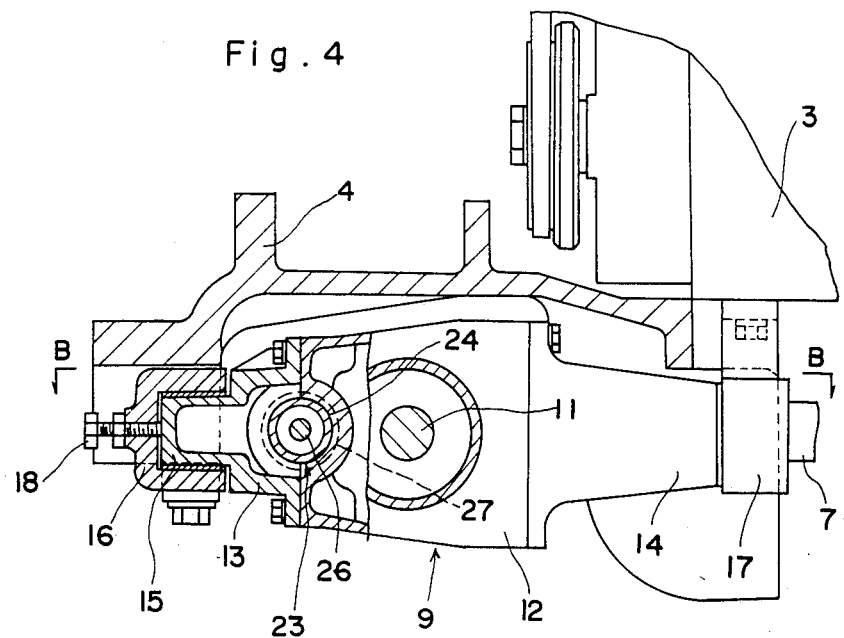
Figure 5:
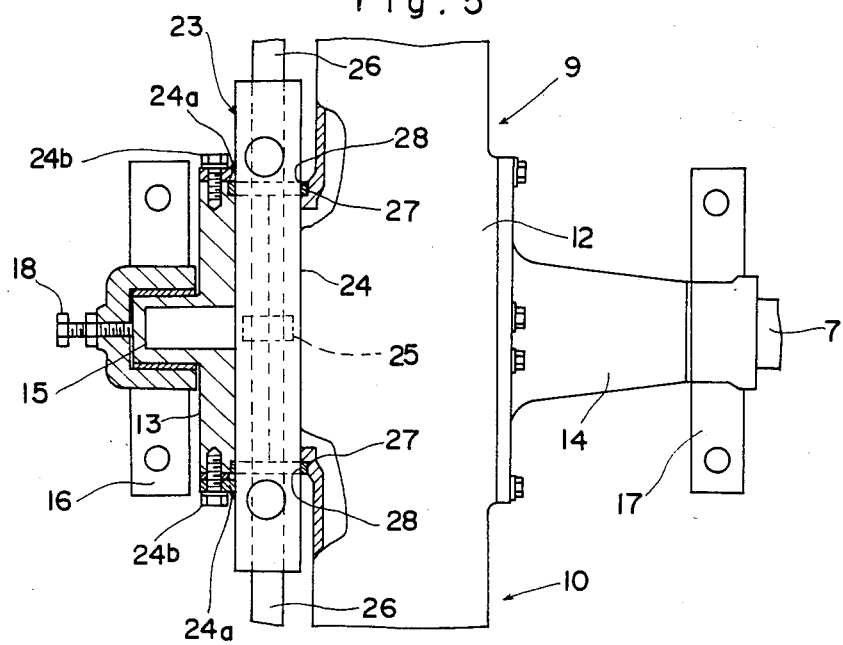

An agricultural tractor of four-wheel-driven type as the first embodiment of the present invention will be described below with reference to FIGS. 1 through 6.

At 1 there is indicated a tractor body which is so constructed that a transmission case 2, an engine 3 and a front wheel support frame 4 are mounted forwardly in order. The numeral 5 indicates a pair of right and left front wheels and 6 denotes a pair of right and left rear wheels. At 7 there is shown a propeller shaft for driving the front wheels 5. Numeral 8 shows a steering handle. At 9 there is shown a front wheel supporter which comprises a casing 10 and a pair of right and left drive shaft 11 housed in the casing. The casing 10 comprises a tubular member 12, a shaft casing 14 and a lid 13 which is detachably disposed on the tubular member 12 at the middle portion of the front side in the transverse direction thereof. In the middle portion of the casing 10 in the transverse direction, there are housed a differential gearing which receives a power from the propeller shaft 7 and drive shafts 11 as output shafts extending right and left from the differential gearing. A center pin 15 which extends forwardly of the tractor body 1, projects from the center portion of the front side in the transverse dirrection of the lid 13. The center pin 15 is rotatably mounted on a supporting member 16 which is fixed on the under side of the front wheel support frame 4, and the shaft casing 14 disposed on the same axis since the center pin 15, is also mounted rotatably on another supporting member 17 which is fixed to the underside of the engine 3, so that the front wheel supporter 9 may be swung about the center pin 15. The numeral 18 indicates an adjusting bolt. At 19 there is denoted a pair of right and left transmission cases each of which is attached to flange 20 of each of the ends of the tubular member 12. The numeral 21 shows a pair of right and left front wheel cases each of which is provided rotatably or tiltably about a king pin housed in the front case 21 and adapted to extend to the transmission case 19. The front wheels 5 are driven by the drive shafts 11 via a final step reduction device or the like housed in the front wheel cases 21 to extend to the transmission cases 19. At the middle portion in the direction of height of the front side of the front wheel cases 21, a steering arm 22 is secured respectively to project forward and slantwise to face the inside or center of the tractor. The caster angle of the front wheels 5 is 5 to 11 degrees. At 23 there is indicated a steering cylinder which is disposed perpendicular to the center pin 15 and along the front side of the tubular member 12 at the middle portion thereof in the transverse direction of the tractor body 1, so as to swing with the front wheel supporter 9. The steering cylinder 23 mainly comprises a cylinder tube 24, a piston 25 and a pair of rods 26 extending in the right and left directions. The cylinder tube 24 is secured between the fitting side walls of the tubular member 12 and the lid 13, and secured to the lid 13 with brackets 24a of the cylinder tube 24 by means of bolts 24b, thus preventing the movement of the cylinder tube 24 in the direction of the axis thereof. A ring 27 which is respectively provided at each of the sides of the cylinder tube 24, is engaged with recesses 28 formed with the tubular member 12 and the lid 13, so that the cylinder tube 24 is blocked to move in the transverse direction also. A pressure oil is supplied to the cylinder tube 24 from an oil tank 29 via an oil pump 30 and an oil pressure control valve 31 which may be operated by means of a handle 8. Each of the piston rods 26 is operatively connected to each of the steering arms 22 by means of joint member 32, a turnbuckle 33, a connecting shaft 34 and so forth. The piston rod 26 is threadedly connected to the joint member 32 and secured thereto by means of a lock nut 35. The turnbuckle 33 comprises a main body 36, a pair of threaded shafts 37, 38 telescopically threaded to the main body 36, and a lock nut 39. A ball joint 40 is disposed between the inner threaded shaft 37 and the joint member 32. Also, another ball joint 41 is arranged between the outer theaded shaft 38 and the connecting shaft 34. The connecting shaft 34 is secured to the steering arm 22 by means of a nut 44. According to the embodiment constructed in the above mentioned manner, the power steering apparatus may be operated as follows: OPERATION—When the oil pressure control valve 31 is operated with the handle 8, a pressure oil is supplied to the steering cylinder 23 and then the piston 25 and both of the piston rods 26 may be moved in right or left direction, so that each of the front wheel cases 21 may be rotated about the king pin by means of the joint member 32, the turnbuckle 33, the connecting shaft 34 and the steering arm 22, and therefore each of the front wheels 5 may be steered. In this operation each of the front wheels 5 may be smoothly steered since the ball joint 40 is disposed between the joint member 32 and the inner threaded shaft 37 and also the ball joint 41 between the outer threaded shaft 38 and the connecting shaft 34. Further, the steering arm 22 is disposed at the middle portion in the direction of height of the front side of the front wheel case 21 to project forward and slantwise to face the inside or center of the tractor body 1 and the caster angle ranges from 5 to 11 degrees which are greater than those of the prior art. Therefore, when the steering arm 22 is rotated or tilted inwards, the locus of the steering arm 22 is lower in comparison with the prior art, so that the maximum steering angle of the front wheel 5 may be great without contacting the steering arm 22 with the flange 20 of the tubular member 12, when the front wheel 5 is tilted greatly or sharply.

Further, since the steering cylinder 23 is disposed perpendicular to the center pin 15 and along the front side of the tubular member 12 so as to swing with the front wheel supporter 9, the steering cylinder does not prevent swing of the front wheel supporter 9. Therefore, a maximum steering angle of the front wheels 5 may be made great. Further, since the steering cylinder 23 swings with the front wheels supporter 9, there occurs no relative gap between these elements. Therefore, it is possible to prevent ricktiness or looseness about the connecting portion between the steering cylinder 23 and the steering arm 22. Namely, in other words there is no steering action on the front wheels 5 due to the up and down swing of the front wheels 5 about the center pin 15.

Figure 7:
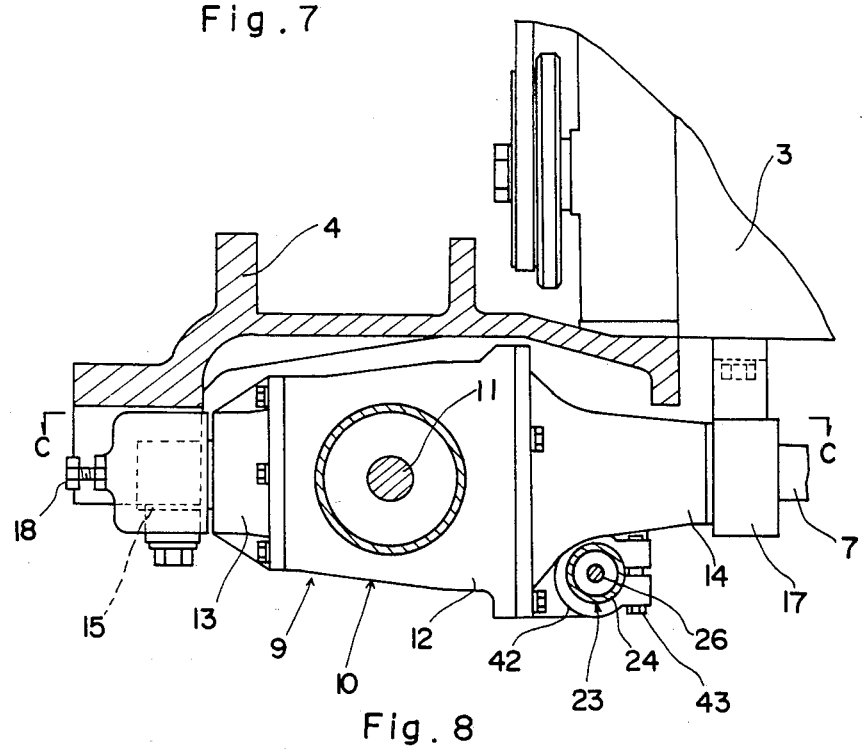
Figure 8:
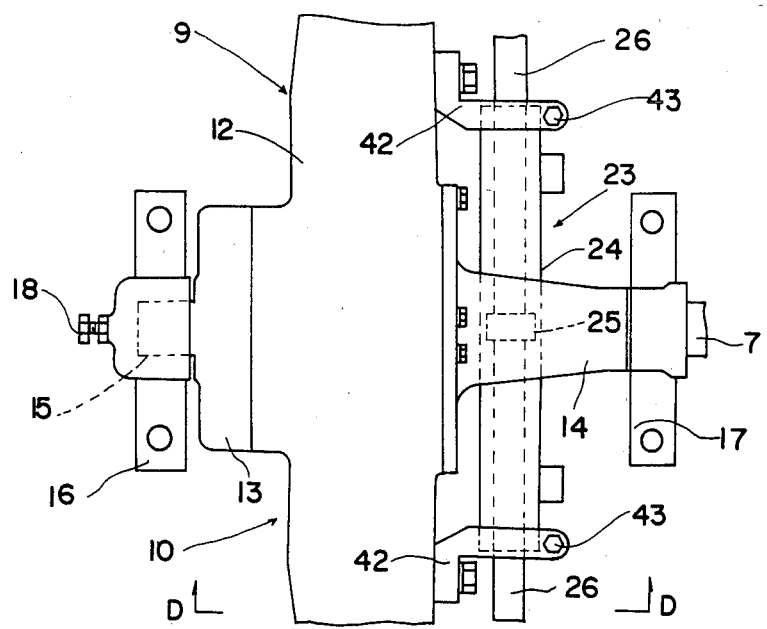
Figure 9:
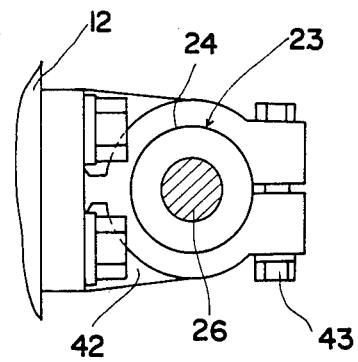

FIGS. 7 through 9 show the second embodiment of the present invention. The steering cylinder 23 is disposed along the rear side of the tubular member 12 and extends under the shaft supporting case 14. A pair of clamp members 42 are disposed to project rearwardly from the middle portion in the transverse direction of the tubular member 12, and each of the ends of the cylinder tube 24 is fitted into the clamp member 42 and secured thereto by means of bolts 43. Further the joint member 32 and the turnbuckle 33 are disposed rearwardly of the tubular member 12 and the steering arm 22 is disposed to project rearwardly from the front wheel case 21.

Figure 10:
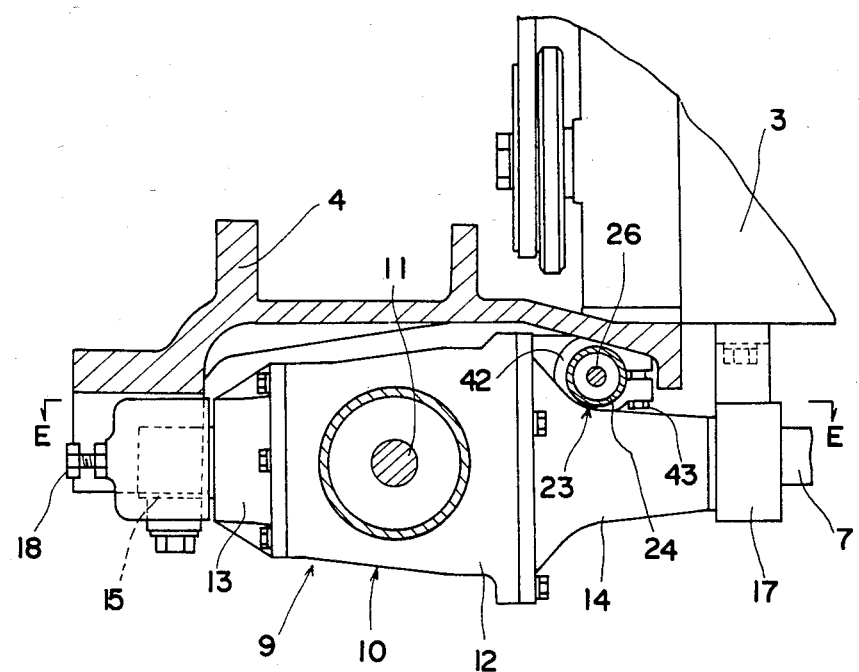
Figure 11:
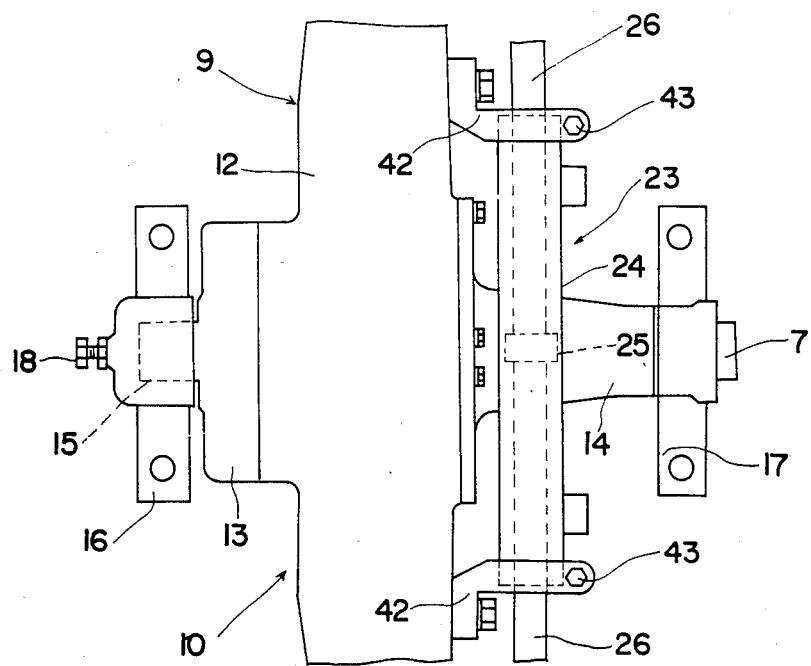

FIGS. 10 and 11 show a further embodiment. The steering cylinder 23 is mounted on the upper side of the shaft supporting case 14 and in parallel with the front wheel supporter 9. In this case, since the shaft supporting case 14 is integral with the front wheel supporter 9 and the steering cylinder 23 are swung about the common axis of the center pin 15, there occurs no relative gap between these elements and therefore the object of the present invention may be realized.

Figure 12:
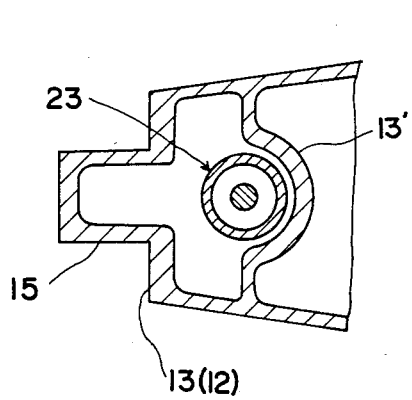
FIGS. 12 and 13 show sectional side views of partly modified embodiments.

FIG. 12 shows an improvement in which the steering cylinder 23 comprising the tubular member 12 is constructed in integral with the lid 13. It is not necessary to bolt the lid 13 having the center pin 15 to the tubular member 12 and therefore there occurs no problem about loosening of the bolts. The numeral 13' indicates a partition wall.

Figure 13:
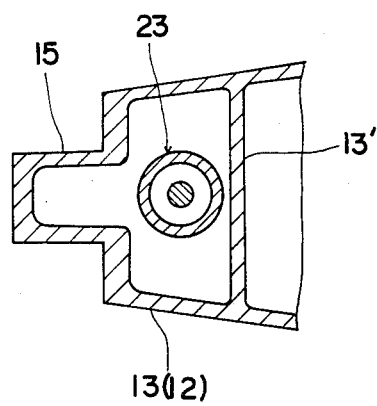
Figure 14:
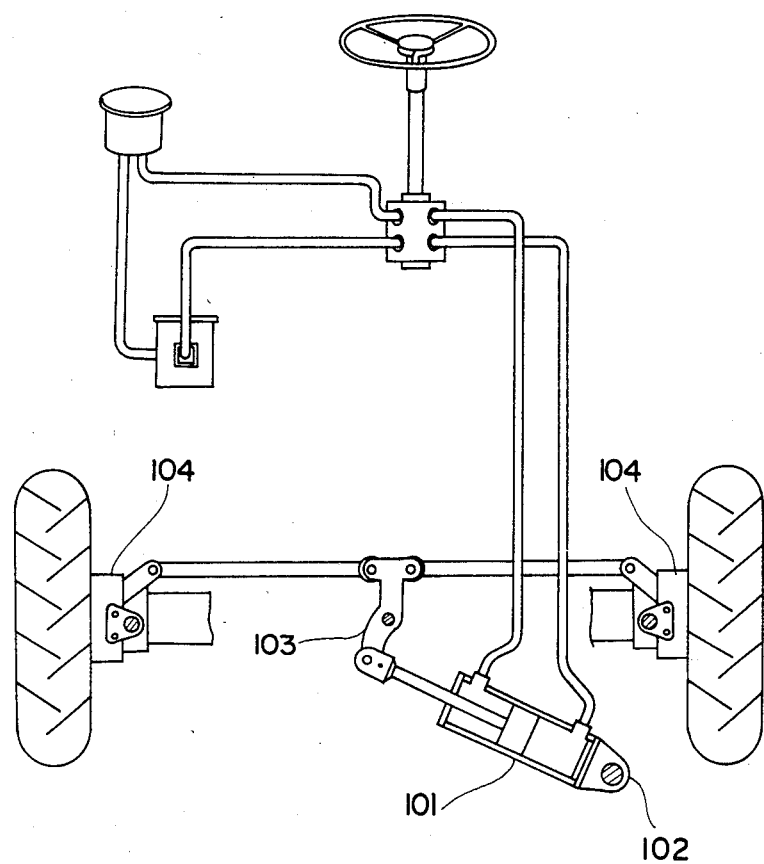
FIG. 14 shows a schematic view of the power steering apparatus of the prior art.

FIG. 13 shows another improvement in which the position of the steering cylinder 23 in FIG. 12 moves forwardly and the partition wall 13' forms a straight and vertical wall. In this case the partition wall 13' may be easily casted and manufactured.

Although the above mentioned embodiments show an agricultural tractor of four-wheel-driven type, the present invention may be adopted for such a vehicle which is provided with non-driven front wheels.

We claim:

1. A front wheel power steering apparatus for a front wheel drive vehicle having a body and steering wheels comprising:

a front wheel support assembly extending transversely of said vehicle body and supported by said vehicle body for pivotal movement about a longitudinal axis, said front wheel support assembly including a front axle case having a front and a rear side, a front wheel axle housed in said front axle case, a drive shaft supporting case attached to the rear side of said front axle case and pivotally supported by said vehicle body, a lid detachably attached to said front side of said front axle case, said lid includes a center pin extending forwardly thereof which is rotatably supported by said vehicle body, a steering cylinder supported on said front wheel support assembly between said front axle case and said lid so as to oscillate with said front axle case, steering arms respectively associated with said steering wheels for steering said steering wheels, and tie rod means operatively connected between said steering arms and said steering cylinder for operating said steering arms to steer said steering wheels.

2. A power steering apparatus of claim 1 wherein said shaft supporting case is arranged to house a propeller shaft for transmitting engine power to said front axle, and said center pin and said shaft supporting case being coaxially aligned to establish said longitudinal axis for the pivotal movement of said front axle case.

3. A power steering apparatus of claim 2 wherein said steering cylinder includes at least one outer ring received in a recess defined on said front axle case and said lid.

4. A power steering apparatus of claim 2 wherein said steering cylinder further includes brackets secured to said lid.

5. A power steering apparatus of claim 2 wherein said tie-rod means is pivotably connected to said steering arms by means of ball joints.

* * * * *